Figure 1:
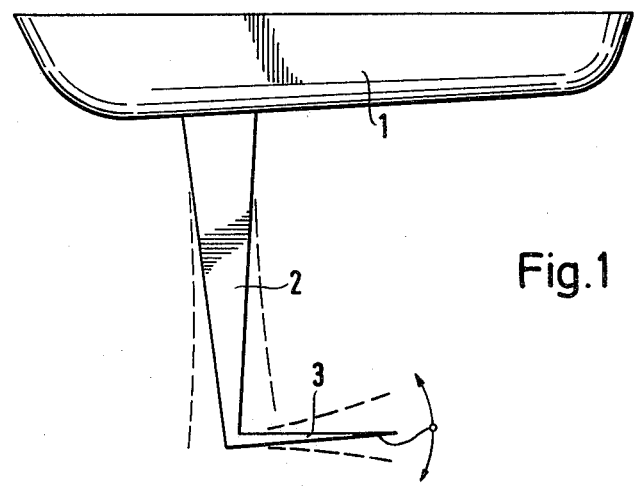

United States Patent [19]

Jakobsen

[11] 4,332,571
[45] Jun. 1, 1982

[54] WAVE MOTORS

[76] Inventor: Einar Jakobsen, Roven, N-1920, Sørumsand, Norway

[21] Appl. No.: 959,293

[22] Filed: Nov. 9, 1978

[30] Foreign Application Priority Data

Nov. 11, 1977 [NO] Norway .............................. 773849

[51] Int. Cl.³ .......................... B63H 1/30; B63H 5/00
[52] U.S. Cl. ......................................... 440/9; 440/14; 416/79
[58] Field of Search ....................... 115/4, 5, 76, 28 R, 115/28 A, 29; 60/497, 498, 499, 505, 506; 440/9, 10, 13–16, 21–22; 416/79–83, 135

[56] References Cited

U.S. PATENT DOCUMENTS

| | | | |
|---|---|---|---|
| 1,532,459 | 4/1925 | White | 115/4 |
| 2,021,815 | 11/1935 | Strout | 115/4 |
| 2,367,765 | 1/1945 | Fickler | 115/4 |
| 2,520,804 | 8/1950 | Hollar | 115/4 |
| 3,018,749 | 1/1962 | DeBeurs | 115/4 X |
| 3,232,608 | 2/1966 | Vlacancich | 115/28 R X |
| 3,453,981 | 7/1969 | Gause | 115/4 |
| 3,605,676 | 9/1971 | Spangenberg | 115/28 R X |

FOREIGN PATENT DOCUMENTS

| | | | |
|---|---|---|---|
| 1408079 | 9/1964 | France | 115/4 |
| 914997 | 1/1963 | United Kingdom | 115/4 |

Primary Examiner—Trygve M. Blix
Assistant Examiner—D. W. Keen
Attorney, Agent, or Firm—Scully, Scott, Murphy & Presser

[57] ABSTRACT

There is disclosed an improvement in wave motors for propulsion of boats, of the type comprising a supporting structure connected to the boat and extending downwards into the water, and a tilting element connected to the supporting structure, the tilting element being adapted to tilt when the boat is moved by the waves. The motor according to the invention is provided with force applying devices always trying to bring the tilting element back into a neutral position when it is angularly displaced away from this, thereby increasing the efficiency of the wave motor.

7 Claims, 3 Drawing Figures

WAVE MOTORS

The present invention relates to an improvement in wave motors for propulsion of boats, which motors comprise a supporting structure connected to the boat and extending downwards into the water when the boat floats thereon, and a platelike tilting element constituting the propulsion means of the boat, the plate plane of the element extending approximately parallel to the cruising direction of the boat, and the part of which pointing in this direction being connected to the lower end of the supporting structure, and the tilting element being adapted to tilt, due to relative movement of the tilting element and the water surrounding this, when the boat floats on the water and is moved by waves.

Such wave motors are known from U.S. Pat. Nos. 2,021,815 and 2,367,765. The tilting elements mentioned therein are rotatably connected to the supporting structure for tilting about an axis extending in the transverse direction in relation to the cruising direction, and the tilting angle of the tilting element is limited by means of stops arranged on the supporting structure.

During said relative movement, the tilting element is tilted one way or the other to rest against one of the stops, whereby further relative movement causes change of the flow direction of the water flowing towards the tilting element, whereby the water is guided rearwards, in the direction opposite to the desired cruising direction, thereby creating a reaction force acting on the tilting element driving the boat in said cruising direction.

In these motors said relative movement cannot be fully utilized. When the boat is moved from a wave trough to a wave crest, the trailing edge of the tilting element is moved downwardly in relation to the axis of rotation, due to the forward location of the axis og rotation on the tilting element, until this is brought to rest against one of the stops. Upon subsequent movement of the boat from the wave crest to a new wave trough, the trailing edge of the tilting element is moved upwardly in relation to the axis of rotation until the tilting element is brought to rest against the other stop, i.e. an angle which equal to the above-mentioned tilting angle.

The distance that the boat must move in order to bring the tilting element from its rest against one stop to the other therefore represents an unutilized part of the available wave energy. In addition, the impacts caused by the tilting element when it strikes against the stops may propagate through the hull and cause discomfort for persons on board.

The object of the invention is to eliminate the above-mentioned drawbacks in connection with previously known wave motors of this type.

The characteristic features of the method and the device according to the invention are evident from the claims.

Figure 2:
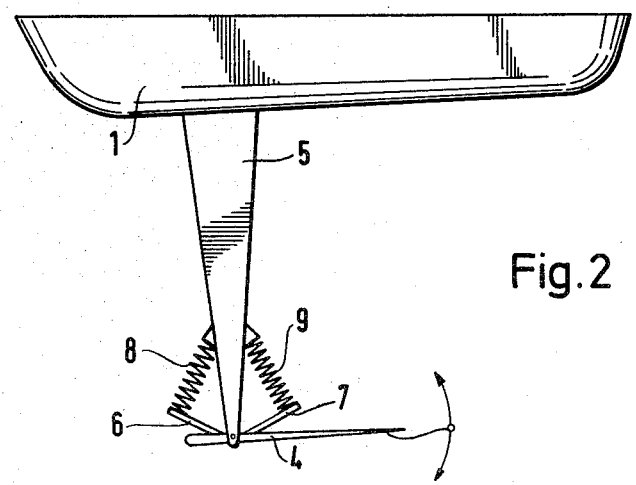
Figure 3:
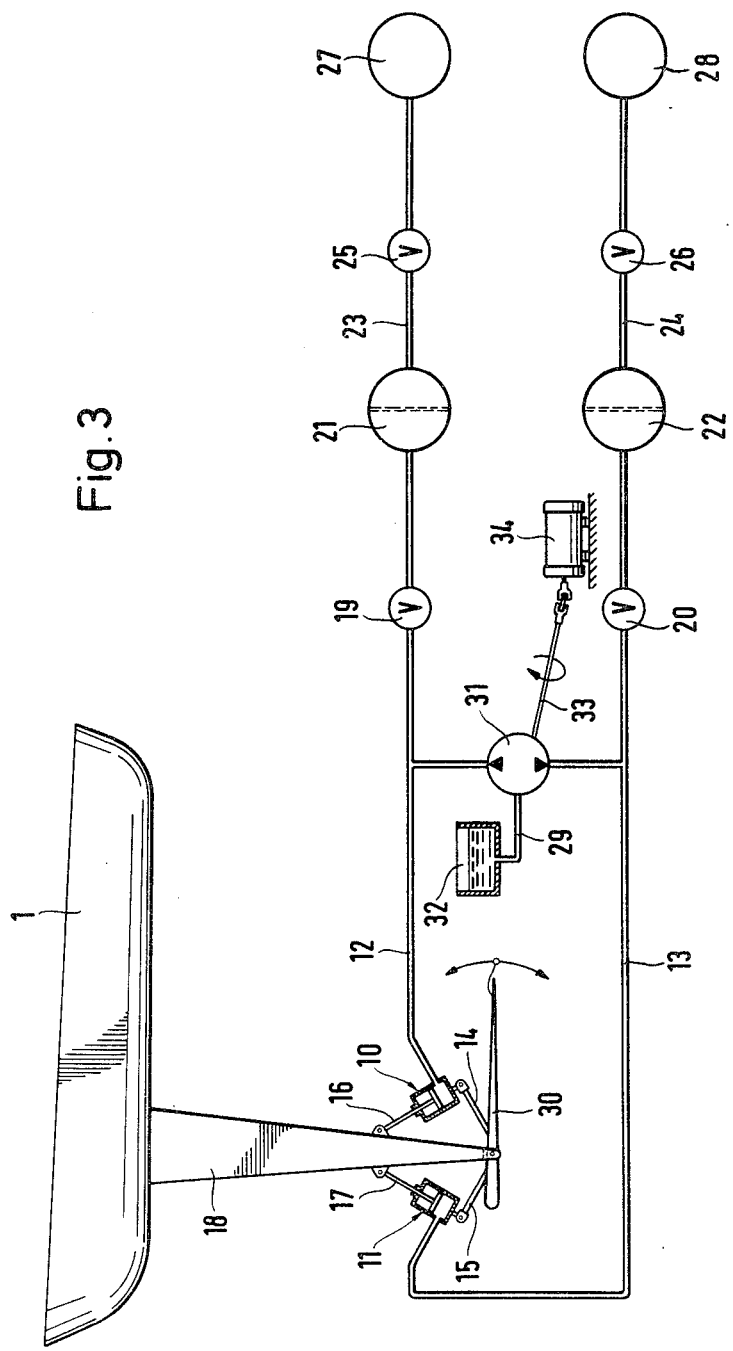

The invention will be explained in detail in the following description with reference to the accompanying drawings, which schematically show embodiments of the device according to the invention, and in which FIG. 1 is an end view of a first embodiment, FIG. 2 is an end view of a second embodiment, and FIG. 3 is an end view of a third embodiment of a device according to the invention and a hydraulic/-pneumatic control system for the tilting element.

According to FIG. 1, the upper end of a beam or a supporting structure 2 extending downwards in the water is fixedly connected to the outer surface of the bottom of a boat 1. The lower end of the supporting structure 2 is fixedly connected to the forward end, as seen in the cruising direction, of a platelike tilting element 3, whose plate plane in unloaded, neutral position is arranged for instance approximately parallel to the water line plane of the boat.

The tilting element 3 is made of a flexible and elastic material and in such a way that it will bend during the above-mentioned relative movement, as indicated in thick dotted lines, while the supporting structure 2 is rigid.

Alternatively, the supporting structure can be flexible and bend, as indicated in thin dotted lines, in order to provide the tilting of the tilting element 3 from the neutral position, whereby this flexible supporting structure also absorbs the shock if the boat runs aground, thus providing safety in such an event.

FIG. 2 shows a second embodiment of a wave motor according to the invention. A tilting element 4 is with its forward part, as seen in the cruising direction of the boat, rotatably connected to a supporting structure 5 about a horizontal axis.

In order to keep the tilting element in neutral position, it is provided with two upwards and rearwards, resp. forwards extending arms 6, 7, the outer ends of which each being connected to the supporting structure 5 by means of a spring 8, 9. By choosing springs with proper characteristics, different amplitudes for the two tilting directions can be obtained when the boat is moved by the waves.

FIG. 3 shows a wave motor which resembles the wave motor shown in FIG. 2, but where hydraulic cylinder assemblies 10, 11 are substituted for the springs 8, 9. Each head end of the hydraulic cylinder assemblies 10, 11, which ends are closed apart from an opening formed in each of these communicating with a conduit 12 resp. 13, are connected to respective arms 14, 15 corresponding to the above-mentioned arms 6, 7. Each cylinder assembly 10, 11 is provided with a piston connected to one end of a piston rod 16, 17, the other end of which is connected to the supporting structure 18.

Each cylinder assembly 10, 11 is through the conduit 12, 13 and a valve 19, 20 connected to an conventional hydraulic accumulator 21, 22, which is provided with a diaphragm dividing the inner space in two rooms. The cylinder assembly 10, 11, the conduits 12, 13 and the accumulator room which is connected thereto are filled with hydraulic fluid, e.g. oil. The other room of the accumulator is filled with a pressurized gas and through a conduit 23, 24 and a valve 25, 26 connected to a gas container 27, 28.

The conduits 12, 13 connecting the cylinder assemblies 10, 11 and the accumulators 21, 22 are branched and connected to the outlet of a pump device 31, the inlet of which is connected to a tank 32 containing hydraulic fluid, through a conduit 29.

The pump device 31 is adapted to supply pressure fluid to either of the conduits 12, 13.

The function of the wave motors is explained below, referring firstly to the device shown in FIG. 1.

When the boat 1 is moved from a wave through to a wave crest the tilting element 3 will bend due to its flexibility and its trailing edge will move downwards in relation to its point of fixation at the supporting structure 2. This causes the water directly above the tilting element 3 to be pressed rearwards, which in turn causes application of a forwards directed reaction force to the boat 1.

When the boat 1 reaches the wave crest and its upwards directed movement is stopped, the tilting element 3, however, will not remain in a deflected position, but swing upwards towards its neutral position due to its elasticity, and provide a gradually reduced reaction force until this position is reached.

When the boat subsequently is moved towards a new wave trough, the tilting element will immediately bend and its trailing edge move upwards in relation to said point of fixation, and thereby at once provide application of a forwards directed reaction force to the boat.

The wave motor shown in FIG. 2 differs from the wave motor shown in FIG. 1 in that the tilting element 4 is rigid and upon tilting from its neutral position is brought back to this position by means of the springs 8, 9. In order to prevent that the tilting element offers too much resistance against upwards directed movement and that the boat shall be pulled under the water, the spring characteristics may be adapted accordingly.

During operation of the wave motor shown in FIG. 3 in a way similar to the way explained in connection with FIGS. 1 and 2, the valves 19, 20 are open, while the valves 25, 26 are closed and the pump device 31 is not running. Upon application of a force to the tilting element 30, which force causes anticlockwise movement of the tilting element from its neutral position, oil will be pressed out from the cylinder assembly 10 and into the hydraulic accumulator 21 through the conduit 12, due to movement of the piston of this cylinder assembly into the cylinder, thereby gradually compressing the gas in this accumulator and progressively increasing its pressure.

Simultaneously, oil will be drawn out of the other accumulator 22 through the conduit 13 to the cylinder assembly 11, whereby the gas pressure in this accumulator 22 decreases until moment balance is obtained around the tilting axis of the tilting element 30. When the force is no longer applied to the tilting element, this element is brought back into its neutral position due to the moment unbalance about its tilting axis.

By opening one or both of the valves 25, 26 in the conduits 23, 24 interconnecting the accumulators 21, 22 and the gas containers 27, 28, the available gas colume may be increased, thereby changing the spring characteristic of the system.

By closing the valves 19, 20 the tilting element 30 can be locked in any desired position, and by means of the pump device 31 the tilting element 30 can be moved and then locked, for instance for retarding the boat by means of wave action. By means of the hydraulic pump device 31 the tilting element can also be continuously moved from one extreme position to the other, the tilting element then acting as a mechanically/hydraulically driven propulsion device. A driving means for pump 31 is illustrated schematically by motor 34 operating through shaft 33 to drive pump 31.

What I claim is:

1. A wave motor for propulsion of a water-bourne vessel influenced by wave action, comprising:
   a. a support structure rigidly connected to the vessel and extending downwards therefrom to have a lower end thereof located at a distance beneath the hull of the vessel at a level at which the water is relatively calm in relation to water movements at the water surface because of wave action;
   b. propulsion means comprising an essentially horizontally disposed, platelike tilting element which, at a forward portion thereof as viewed in the cruising direction, is rotatably connected about a horizontal axis to said lower end of said supporting structure, and is adapted to effect a tilting movement as a result of relative movement between said element and the surrounding water when said vessel is rising and lowering due to wave action at the water surface; and
   c. means causing said tilting element to be held in a substantially horizontal neutral position when no relative movement exists between the element and the surrounding water, said means comprising a force-exerting device connected between said supporting structure and said tilting element and exerting opposed, resilient returning forces on said tilting element upon angular displacement thereof, to bring it back to said neutral position.

2. A wave motor according to claim 1, wherein said force-exerting device comprises hydraulic cylinder/piston assemblies whose cylinders are connected through respective conduits to associated hydraulic/pneumatic accumulators.

3. A wave motor according to claim 2, wherein a valve is inserted in each of said conduits for closing the connection between said cylinder assemblies and said accumulators.

4. A wave motor according to claim 3, wherein said cylinder/piston assemblies are connected to a supply of pressurized hydraulic fluid.

5. A wave motor according to claim 1, wherein said returning forces acting in both tilting directions are approximately equal for the same tilting angle.

6. A wave motor according to claim 1, wherein said returning forces acting in both tilting directions are unequal for the same tilting angle.

7. A wave motor according to claim 1, wherein said force-exerting device comprises mechanical spring means.

* * * * *